United States Patent [19]
Ricards et al.

[11] 3,949,159
[45] Apr. 6, 1976

[54] COMPOSITE PAGE SETTER

[75] Inventors: Charles R. Ricards, Emporium; David M. Reed, Bethlehem, both of Pa.

[73] Assignee: American Newspaper Publishers Association, Easton, Pa.

[22] Filed: Feb. 21, 1975

[21] Appl. No.: 551,874

Related U.S. Application Data

[63] Continuation-in-part of Ser. No. 411,852, Nov. 11, 1973, abandoned.

[52] U.S. Cl. ............................. 178/6.6 B; 178/6.7 A
[51] Int. Cl.² ............................................ G03F 7/02
[58] Field of Search .......... 178/6.6 B, 6.6 A, 6.6 R, 178/6.7 R, 6.7 A

[56] References Cited
UNITED STATES PATENTS

| | | | |
|---|---|---|---|
| 3,506,779 | 4/1970 | Brown............................... | 178/6.6 B |
| 3,600,507 | 8/1971 | Newgard.......................... | 178/6.7 A |
| 3,646,262 | 2/1972 | Moe.................................. | 178/6.7 R |
| 3,739,088 | 6/1973 | Landsman........................ | 178/6.7 R |

Primary Examiner—Raymond F. Cardillo, Jr.
Attorney, Agent, or Firm—David H. Semmes

[57] ABSTRACT

A system and method for assembling all components of a page to be printed, such as a full newspaper page consisting of both text and illustrations. The end product can be a positive or negative image on paper or film, or a final printing plate. The uniqueness of the invention resides in the combination of text matter directly from a computer memory with illustrations physically stored on part of a device. A photoelectric transducer scans the illustrative copy to generate electronic signals in real-time. These electronic signals are combined with the electronic signals generated by the computer text through a logic circuit so that each item is transmitted through a recording means such as a recording (writing) laser to provide the proper image, in the proper page location on the recorder surface. The approach of the invention is a machine with illustrative copy working jointly with a computer containing text matter that outputs the completed page, with each component in its proper position, through a writing device.

14 Claims, 5 Drawing Figures

COMPOSITE PAGE SETTER

CROSS-REFERENCE TO RELATED APPLICATIONS:

This is a continuation in-part of copending application 411,852 filed on Nov. 11, 1973, now abandoned, of Charles F. Ricards, et al for Composite Page Setter.

BACKGROUND OF THE INVENTION:

Computers are accepted tools in today's newspaper or the like production methods. The computer can store inputted text, provide hyphenation and justification to lines, and assemble the component stories of the page in an ordered sequence within its memory.

These computer internal operations are relatively high speed, but, when the computer is ordered to output the information, its speed is cut drastically by the limitations of the output devices to which it is connected.

Newspapers and the like presently output computer stored text in columnar form, process photographs separately, assemble these page components by a hand paste-up operation, produce a photographic negative, and finally make a printing plate. This process currently requires about 40 minutes per page.

In addition, illustrations, especially photographs, can, with present technology be digitized and stored within a computer memory. However, such a procedure is not used in practice because it requires an excessive amount of memory for storage of each illustration. This requires a considerably larger, more expensive computer than newspapers presently find economical and, therefore, is not a practical solution.

Utilizing the teachings of the present invention, the equipment, with its related technique, is aimed at producing a page, photographic negative, or plate from start to finish in ten minutes or less and with economically feasible computer hardware.

BRIEF DESCRIPTION OF THE INVENTION:

The present invention utilizes a new approach to a system and method by providing a machine, operating jointly with a computer, that will scan illustrative copy concurrently with page text material being manipulated and stored in an active computer, and selectively output a real-time signal from either the illustrative storage device or the computer memory the necessary information, in its proper sequence to assemble all components of a page in one location, at one time, and in full page assembly form. This information may be used to modulate either a laser that can expose photosensitive material, heat sensitive material, UV sensitive material or printing plates directly, or any other page writing device.

All textual material which is to be assembled as a portion of a newspaper page, and subsequently set, for example, with a laser writer, is stored in the computer as strings of data referred to as character strings. Each character string contains the following data: vertical and horizontal position (with respect to the newspaper page) of the characters, size and font type of characters, and the set of characters to be assembled. In a similar manner, picture strings are also stored within the computer. Each picture string contains only the position and size of the desired picture.

Each alphanumeric character is represented, within the computer, as a matrix of squares. One bit for each square indicates whether that square should visually appear black or white when exposed to the Laser Page Setter. The number of cells required in the matrix is dependent on the quality desired for the textual material.

The computer program keeps track of the current scan line being exposed by the writing device. The scan lines are numbered from zero to 22,000 on the page starting at the top of the page. From the character string information, the computer program determines the proper characters and pictures that are present in the current scan line as well as the relative vertical position within each character. From this information, the run length code for the entire scan line is generated within the computer.

One 16 BIT word of run length code indicates whether white or black should appear on the page and the length of that white or black line. Each scan line is generated from a series of these 16 BIT words of run length code, the total of all the lengths adding up to the width (in thousandths of an inch) of the page.

Each of the run length code words for a given scan line is transmitted, in turn, to the electronic control logic circuit. After accepting a code word from the computer, the electronics control logic transmits a busy signal to the computer. The computer will not transmit the next code word to the Composite Page Setter until the busy signal disappears. The electronic control logic will extinguish the busy signal only after the run length code word has been processed and the lengths moved into the shift registers. In this manner, access to the textual material stored within the computer is controlled and synchronized by the Composite Page Setter electronic control logic.

The final material to be imaged depends upon the imaging energy required and wavelength sensitivity it possesses and a matching laser whose output beam is efficient in both the wavelength and energy ranges for the material used. For example, a photographic film negative or positive would normally be "exposed" by a laser beam that has a peak output in the visual region of the spectrum. An ultraviolet (UV) sensitive material would be exposed by a UV peaking laser. A heat sensitive material could be exposed by a heat generating infra-red (IR) laser, etc. Here the term "exposed" includes a reaction to a laser beam. In some instances, such as certain printing plates, the laser beam may actually vaporize, or otherwise remove the material it contacts.

In essence, the present invention permits combining text and illustrations in full page assembly quickly without the need of extensive high-cost computer storage. This is accomplished through a logic circuit a herein briefly explained, that acts essentially as a switching network to selectively operate from either of the storage devices, i.e., computer memory and illustration hard copy.

Additional objects, advantages and features of the present invention will be more readily apparent from the following more detailed description of an embodiment thereof taken together with the accompanying drawings.

DESCRIPTION OF THE PREFERRED EMBODIMENT

Figure 1:
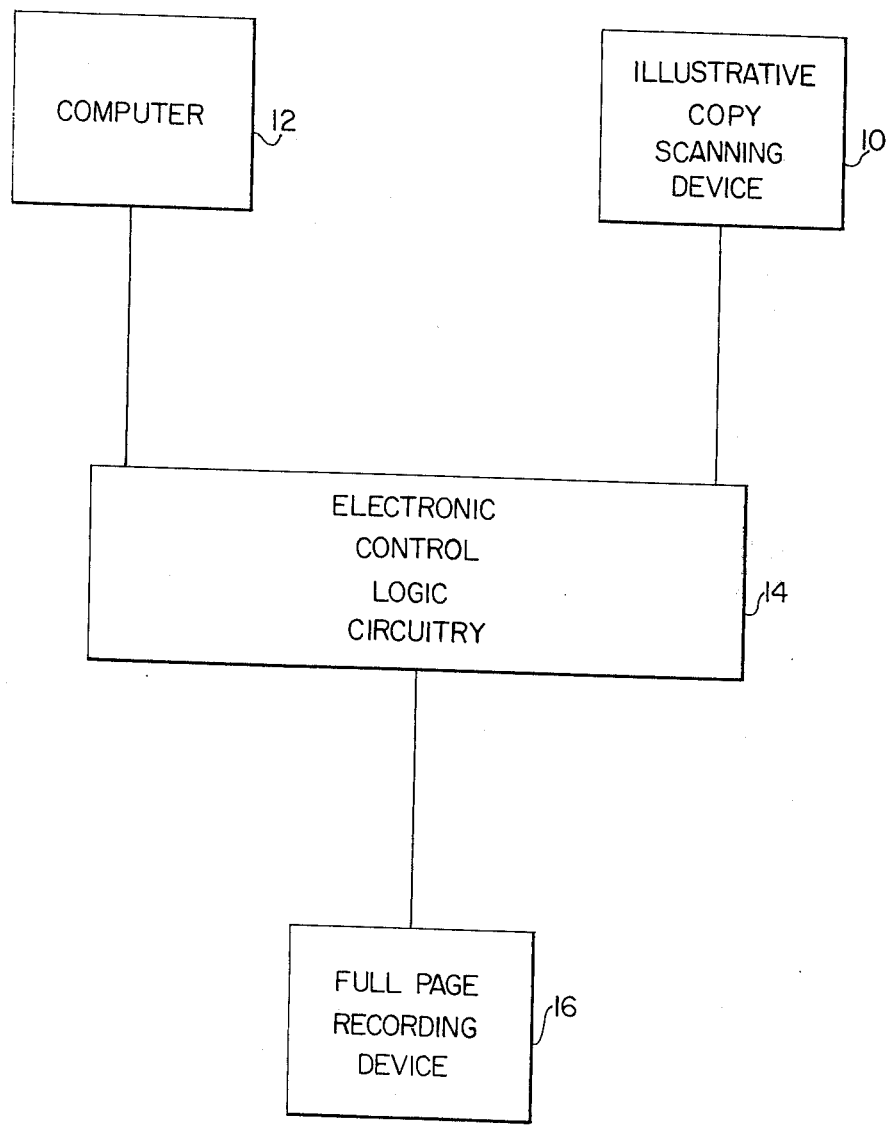
FIG. 1 is a block diagram illustrating the component breakdown of the overall system of the invention.

Referring now in greater detail to FIG. 1, a laser page setter, hereinafter referred to as LPS, consists of four basic components: Computer 12, Electronic Control Logic Circuitry 14, Illustrative Copy Scanning Device 10, and the Full Page Recording Device 16.

The function of the computer generally indicated at 12 is to assemble story text, provide hyphenation/justification, and to assemble story components in page format, blocking out areas designated for illustrations, all within its memory. Additionally, the computer, whether it is the same computer that performs the function above or another computer designated as a front end for the LPS, is required to take the stored paginated text and create scan lines across the page in the form of meaningful electronic signals. The number of scan lines created per unit page length determines the resolution of the output; i.e., 100 lines/inch, 500 lines/inch, 1000 lines/inch, etc. This operation requires the storage of digitized fonts within the computer memory. Consequently, the end result of the computer function is to output, upon command, meaningful electronic signals representing scan lines across the computer stored page.

The illustrative copy scanning device, generally indicated at 10, is the illustration storage component of the LPS. The size of the surface upon which the illustrative copy is physically attached is determined by the application size required; i.e., a newspaper page would require a scanning surface of approximately 15 × 24 inches. The location of the illustrative copy on the scanning surface of the device is obtained from the computer memory and the illustration is physically attached in its proper corresponding position on the surface. The entire surface of the scanning device 10 is scanned a line at a time concurrent with the computer generation of a scan line from the computer stored text. Output from the illustrative copy scanning device 10 is in the form of a real-time electronic signal generated by a photoelectric transducer which is responsive to reflected light from the scanned surface.

It is the broad function of the electronic control logic circuitry, generally indicated at 14, to synchronize the computer 12 output with the illustrative copy scanning device 10 output and to select and switch between the two such that the electronic output data of the control logic circuitry contains both text and illustrations in their proper order, as hereinafter illustrated more particularly with reference to FIGS. 3a and 3b.

The electronic output from the control logic circuitry 14 is then used to drive a full page recording device, generally indicated at 16. The recording device consists of a surface upon which the recording medium (photosensitive material, heat sensitive material, UV sensitive material, or printing plate) is placed. A laser beam from a modulated laser source scans the recording medium in much the same way as the illustrative copy scanning device. With the scan cycle of the recording device synchronized with the outer components of the LPS, the output of the electronic control logic circuitry is used to modulate the laser beam, thereby either exposing the recording medium with the laser beam or not. This is done one scan line at a time until all the text matter in the computer and all the illustrations on the scanning device have been combined and exposed on the recording medium in their proper order, in full page assembly form. The recording medium may then be removed and further processed (if necessary) according to its development cycle.

Figure 2:
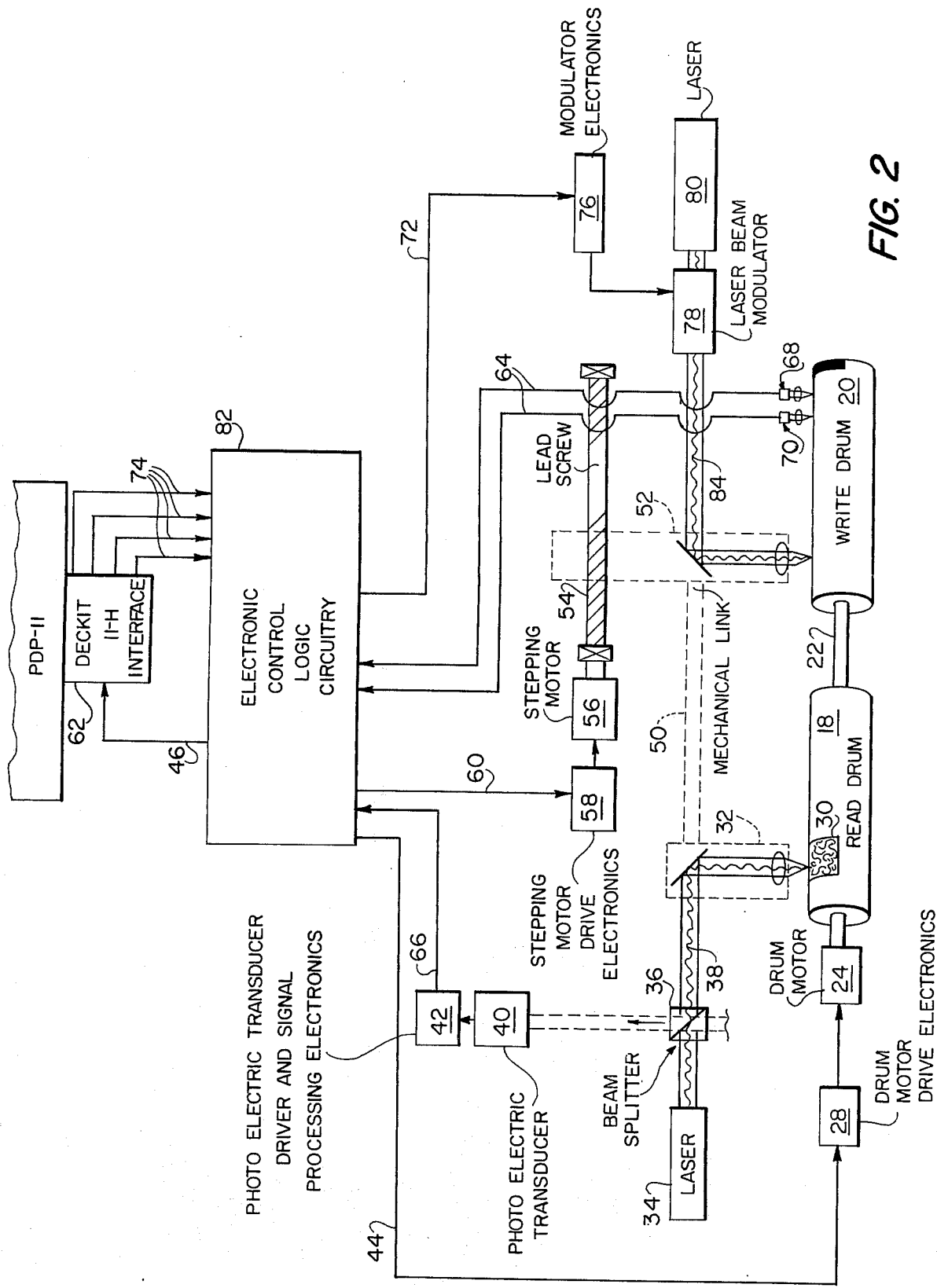
FIG. 2 is a schematic representing, more fundamentally, the operation of each of the basic components of an embodiment of the present invention.

FIG. 2 is a schematic representation of one form of the present invention. Although this particular system uses rotating drums as scanning and recording surfaces, a PDP-11 mini-computer, and a specific electronic control logic circuit arrangement designed to interface with, and operate on the data from the PDP-11, the invention does contemplate the use of other arrangements that would accomplish the same intent as the present invention; i.e., flat bed scanning and recording techniques, etc. computers other than PDP-11, other means of handling the computer and illustrative copy generated data, more than one recording laser, etc.

Figure 4:
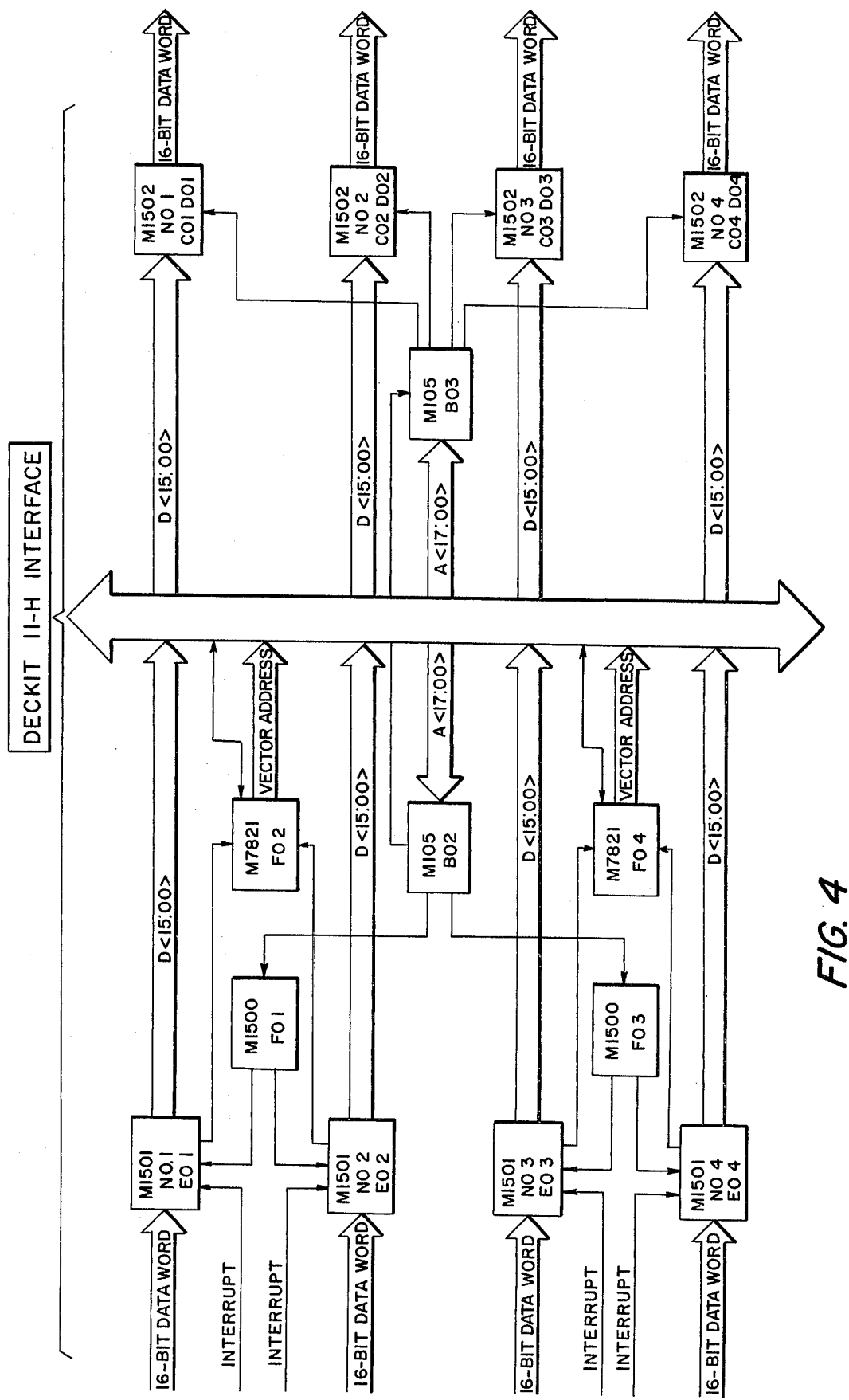
FIG. 4 is a block diagram of a Deckit 11-H interface.

In FIG. 2, there is shown a PDP-11 in connection with a DECkit 11-H interface generally indicated at 62 and further illustrated at FIG. 4. While these products of the Digital Equipment Corporation are used to illustrate one embodiment, any presently known computer with a corresponding interface unit could be substituted thereafter. To illustrate handling of text data for the laser page setter in digital form, herein is described one apparatus for handling a 16 bit binary word which will show in principle the function though it is to be considered merely as illustrative of a single embodiment only. The computer recognizes three states of paginated information; i.e., black, white and illustration. When a scan line of computer stored text is generated within the computer, it exists as a digital series of 16 bit binary words. These words are broken into two parts as shown below:

16 Bit Binary Word
15 14 13 12 11 10 9 8 7 6 5 4 3 2 1 0

| STATE | DURATION IN STATE |
|---|---|
| | (These 14 binary bits can count number of points in a given state, 0–16, 383;i.e., if the scan line resolution is 1000 points per inch, then, the 16 bit word would be capable of describing a state up to 16.383 inches long.) |
| 00 xxxxxxxxxxxxxx | Represents white state |
| 01 xxxxxxxxxxxxxx | " black state |
| 10 xxxxxxxxxxxxxx | " illustration state |

The illustration state tells the electronic control logic circuit to accept real-time data from the illustrative copy scanning device. The electronic handling of printed information in this manner has traditionally been called "run length coding." At the end of a scan line, the computer generates the following word: 11xxxxxxxxxxxxxx. This word signals end of scan line LPS.

The 16 bit words discussed above are transmitted to the electronic control logic circuit of the LPS, generally indicated at 82, through the DECkit which, 11-H interface 62, which as is known, handles the same as shown in FIG. 4. This interface is capable of sending four 16 bit words in parallel and receiving four 16 bit words in parallel. However, in this application, the DECkit sends for words through cables 74, but receives only one word through a cable 46. The one word that the DECkit receives from the LPS control logic circuitry is used to tell the PDP-11 that the LPS is ready to receive additional words for processing. Processing of the 16 bit binary word from the PDP-11 by the control logic circuitry 82 consists of the following operations: when the 16 bit word enters the logic circuitry it is divided into its two parts. Th two bits that describe the state of the word enters and controls a logic circuit hereafter called "State Logic Network". The 14 bits that determine the duration of the state are shifted into the inputs of a 14 bit, binary, down counter. There are four state logic networks and four associated down counters to handle the four 16 bit words that enter the control logic circuitry 82 through cables 74. Additionally, within the control logic circuitry 82 there may be two 16,383 bit static shift registers for example. Since, as discussed previously, a bit could correspond to 0.001 of an inch, for 1000 lines per inch resolution, the static shift registers should then be capable of storing the data for a 16.383 inch scan line. Now, as a clock oscillator drives the counters counting down the 14 bit preset value to zero, it also clocks into the shift register the state of the word. Thus a logic 1 or logic 0 will be checked into the shift register one bit per clock cycle until the counters reach zero. At that time, the next counter starts counting down and clocking its state into the shift registers; and so on, until a complete scan line has been clocked into the two shift registers. Note that the value of one of the two state bits is clocked into the input of one shift register and the value of the other bit is clocked into the second shift register.

When the computer has generated one conmplete scan line of information it gives the LPS a 11xxxxxxxxxxxxxx word. This stops the counters and tells the LPS that the shift registers contain one complete scan line of information and are ready to control the laser modulator. The output of one shift register is used to control the flow of information from the illustrative copy scanning device and the output from the second shift register controls the black or white of the text matter.

Figure 3A:
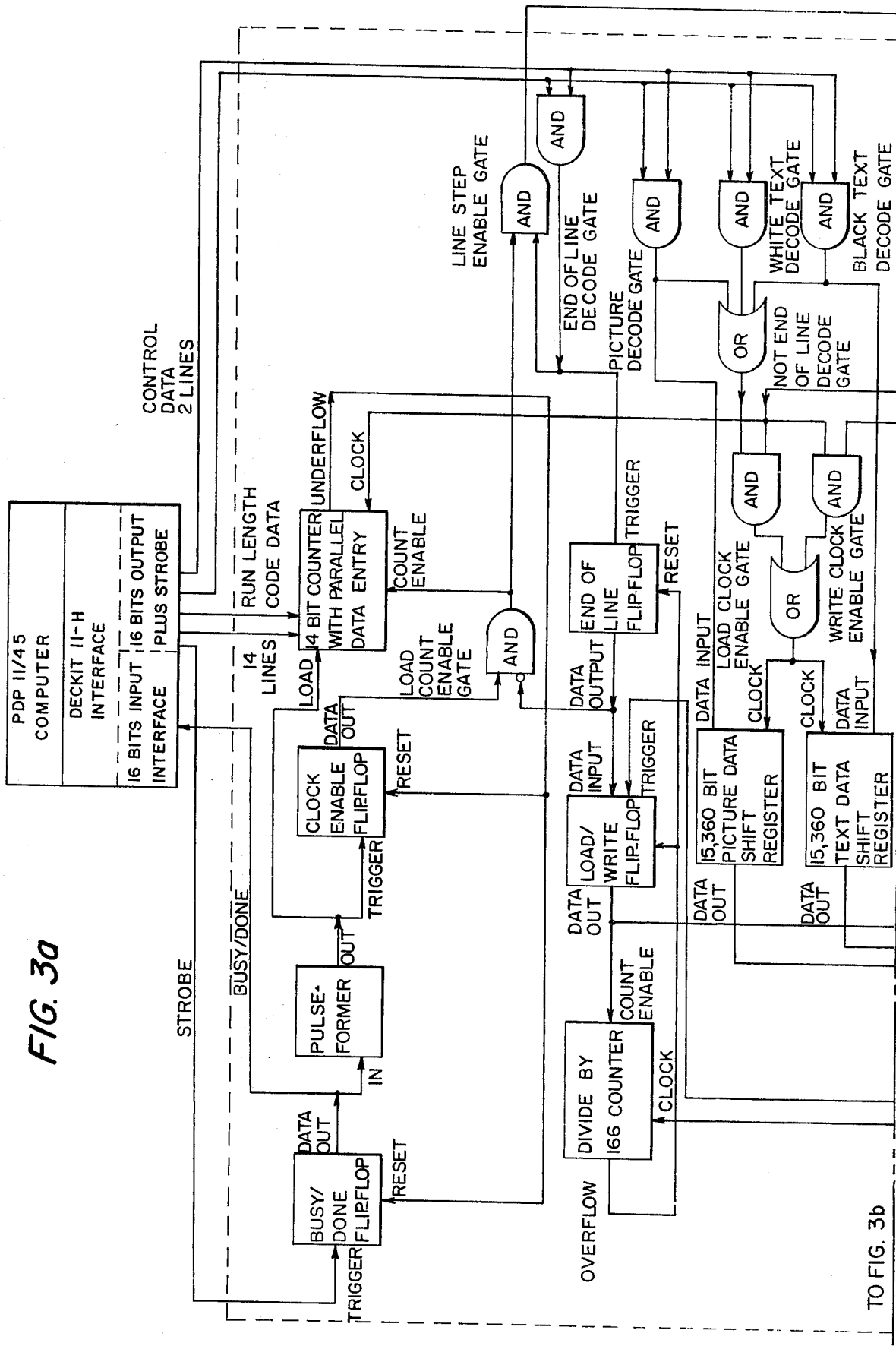
FIG. 3a and 3b further illustrate a preferred embodiment of the functional circuit elements which may be employed to carry out the logic according to the present invention.

Having now described the overall logic function accomplished by logic circuitry 14, attention is directed to FIGS. 3 and 3a, which further illustrate the above discussed invention through illustration of another embodiment of particular logic hardware and circuitry which also may be advantageously employed to practice this invention.

Figure 3B:
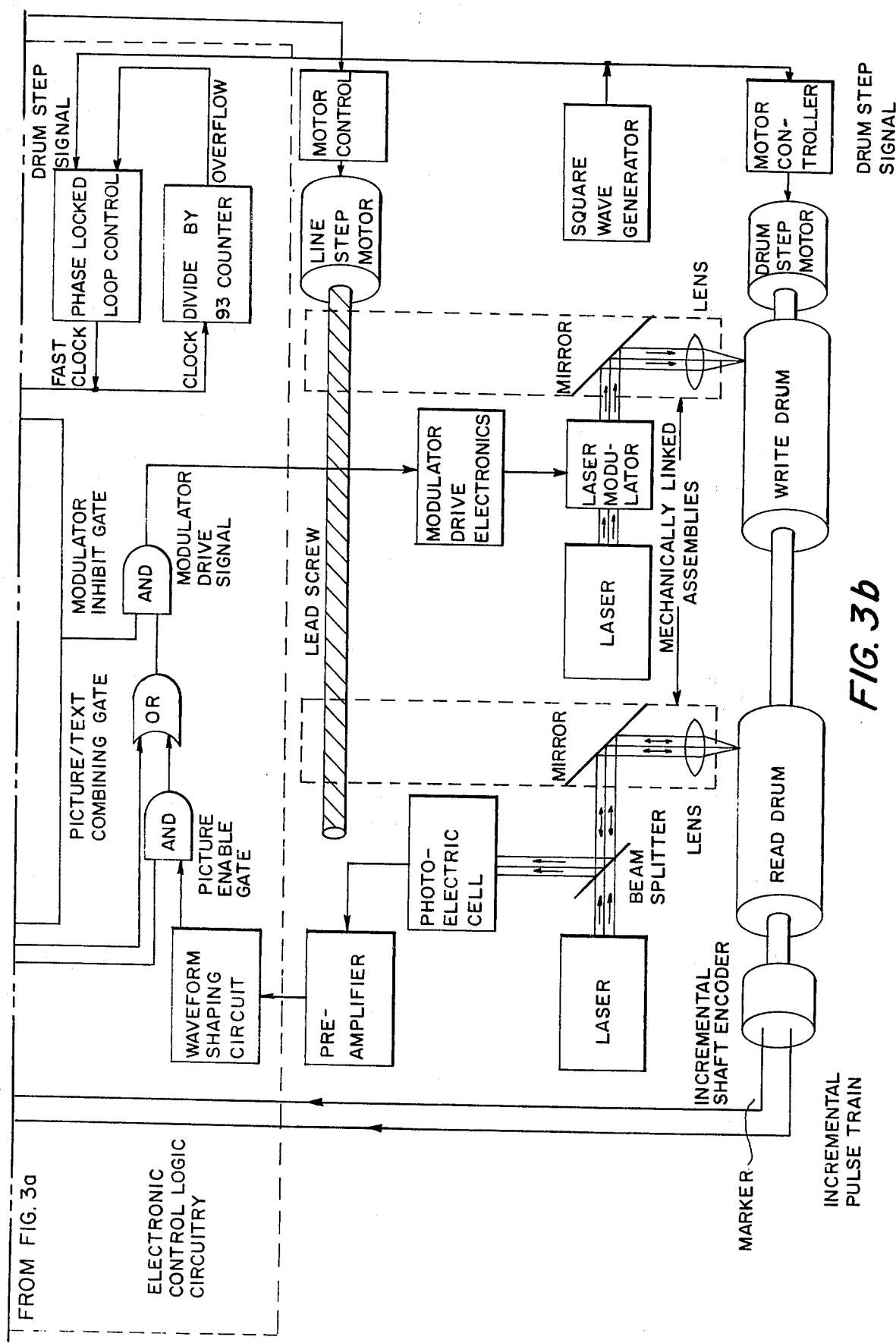

Referring now particularly to FIGS. 3a and 3b it can readily be seen that the electronic control logic executes and controls the sequence of steps performed during two logically independent page setter operations which will hereinafter be designated (1) LOAD and (2) WRITE in the following description.

Briefly, the LOAD operation involves the transmission of run length code from the computer to the electronic control logic of the page setter. Run length code comprising the data for one scan line is received by the control logic and stored in a serial manner within the control logic circuitry for subsequent usage during the WRITE operation. The generation of this run length code within and by the computer has been detailed above.

Specifically, the sequence of steps executed by the electronics control circuits during the LOAD operation are described here as illustrated at FIG. 3a and 3b. The initial conditions of the circuits, at the start of a LOAD operation are:

1. the data output of the "busy/done flip-flop" is in the logical zero state indicating to the computer, via the input interface of the DECkit 11-H functionally illustrated at FIG. 4, that the laser page setter is not busy and can accept new run length code data;
2. the "clock enable flip-flop" and the "end of line flip-flop" are in the zero state;
3. the data output of the "load/write flip-flop" is in the logical zero state thereby causing the "modulator inhibit gate" to suppress writing on the write drum;
4. the 14 bit parallel entry counter and the two 15,360 bit shaft registers shown contain all logical zeroes.

In addition, the square wave generator is producing pulses that are commanding the drum stepping motor and controller to cause the read/write drum assembly to rotate at a constant rate. This same drum drive signal is shown multiplied by a factor of 93 (by well known and published phase-locked loop techniques) to produce a fast clock having an equivalent spatial period equal to 0.001 inch of travel about the circumference of the drum.

The computer is alerted to the fact that the page setter is ready to accept data (via the busy/done signal) and in turn outputs the first run length code data work to the page setter by means of the 16 bits of parallel output provided by the DECkit 11-H interface package. Two bits of the 16 are designated to indicate the type of data represented by the remaining 14 bits: state 00 indicating white text; state 10 indicating black text; state 01 indicating picture; and 11 designating end of scan line. The 14 data bits binarily fix the spatial length (in 0.001 inch increments) that the page setter shall remain in the indicated state during the WRITE operation, as previously discussed.

The 14 data bits are shown to appear as parallel inputs to a 14 bit binary counter designated to operate in count-down mode. A strobe pulse originating in the DECkit 11-H output interface signifies to the page setter that a new data word is present and that the data is stable and ready to be accepted by an external device, i.e., the page setter. The strobe pulse is used as the trigger for the "busy/done flip-flop" thereby causing the data output of this flop to change state and indicate a busy condition to the computer.

The transition of the busy/done flip-flop from logical zero to logical one actuates the "pulse-former" circuit which generates a load pulse for the 14 bit counter. This load pulse causes the 14 data bits from the computer to be entered into the 14 bit counter as shown. This same load pulse causes the "clock enable flip-flop" to change the state of its data output from zero to one thereby enabling the "load count enable gate". Assuming that the two control bits transmitted by the computer do not signify end of line, the 14 bit counter will be enabled for count-down mode. The clock used for the count-down process is the fast clock described previously which generates one clock pulse for every 0.001 inch of drum circumference.

As fast clock pulses are applied to the 14 bit counter, the same pulses are applied as a clock to the picture and text shift registers (again assuming a non end of line condition). The data inputs to the two shift registers is determined by the type of data indicated by the state of the two control lines transmitted by the computer as discussed earlier. As previously noted, if black text is desired, a logical one is presented to the data input of the "text data shift register" while a logical zero is seen at the input to the "picture data shift register." Similarly if picture is desired, in lieu of text, a logical one is presented to the input of the picture register while zero appears as the input to the text register. White space requirements result in logical zeroes at the inputs to both registers. One bit of data is shifted into the two registers simultaneously as each transition of the fast clock occurs.

The 14 bit counter will continue to count-down in response to the fast clock transitions until an underflow condition, indicating a state of all zeroes within the counter, occurs. This underflow signal from the 14 bit counter causes the "busy/done" and "clock enable flip-flops" to be reset to zero. This action has two effects: the computer is again alerted that the page setter is not busy and can accept data, and the clocks to the 14 bit counter and shift registers are disabled thereby inhibiting the counting and shifting operations. The result of the count-down process is that a specific number of bits are loaded into the "text data" shift registers; the exact number of bits corresponding to the length of black or white textual material or pictures desired.

The sequence of transmitting data from the computer to the page setter and in turn counting down this data while loading the shift registers continues repetitively until all 15,360 bits for a single scan line have been loaded into the shift registers according to this embodiment. The computer program determines that the last run length code data word for a given scan line has been transmitted and follows this word with a fixed word containing the two control bits signifying end-of-line. The transmission of this word delimits the LOAD operation.

The WRITE operation begins upon receipt of the two control bits signifying end-of-line. The "end-of-line decode gate" determines that two control bits are in the logical one state and in turn triggers the "end-of-line flip-flop". This flip-flop changes state thereby disabling the "load count enable gate" and also presenting a logical one to the data input of the "load/write flip-flop". At the next transition of the incremental shaft encoder marker pulse, which occurs at a specific point on the read/write drum surface, the "load/write flip-flop" transfers the data at its input line. The transition of the data output of the "load/write flip-flop" from logical zero to logical one causes the following condition: the "divide by 166 counter" is enabled for counting; the "modulator inhibit gate" is enabled to allow writing; and the "write clock enable gate" is enabled to allow shifting of the register data out of the two 15,360 bit shift registers.

The "load/write flip-flop" and "end-of-line" flip-flops will remain in their set states until the "divide by 166 counter" overflows. This condition will occur only after 166 pulses from the incremental shaft encoder have been accumulated; this event thereby fixing the right-hand boundry of the written page. These encoder pulses occur two hundred times per revolution of the drum. According to this embodiment de-limited writing area is set to be slightly larger than the maximum possible area represented by 15,360 bits of 0.001 inch resolution data stored in the shift registers.

During the period of time that the "load/write flip-flop" indicates the write condition, the fast clock shifts data out of the shift register to the modulator control circuits. If black text data is being shifted out of the "text data shift register", a logical one will appear as the modulator drive signal thereby causing the laser beam to be deflected onto the writing surface creating a black dot. Each bit is shifted out of the clock rate which in turn corresponds to 0.001 inch of drum travel. The net effect is to produce a white or black dot at 0.001 inch intervals on the drum surface.

If a logical one appears at the output of the "picture data shift register", the "picture enable gate" allows the picture information to be directly transferred in real-time from the read drum to the write drum. This information is converted to digital form in the "waveform shaping circuit" by simply comparing the amplified analog signal from the photoelectric cell to a set threshold. Voltage levels above the threshold are defined as a logical zero (predominantly white); those below the threshold become a logical one (predominantly black).

White areas of textual material result when the data output of both registers is zero thereby producing no modulation of the laser beam. The process of shifting data from the registers, determining the proper picture of text information to be written, and the subsequent deflection of the laser beam onto the writing medium continues until all 15,360 bits have been shifted out of the shift registers and the "divide by 166 counter" overflows.

Overflow of the 166 state counter causes the "load/write" and "end-of-line flip-flops" to be reset to logical zero. This action disables the "modulator inhibit gate" but enables the "load count enable gate"; this starts the line step process which is the terminal event in the WRITE operation.

By way of summary of this description of this embodiment, it is noted the original data word transmitted by the computer to initiate the WRITE operation contained, in addition to the end-of-line control data, 14 bits of fixed length data (typically the binary equivalent of 156 decimal counts). During the actual writing of the data upon the drum, this 14 bit word remained in the "14 bit counter" since the count was disabled. Overflow of the 166 state counter caused the 14 bit counter to again be enabled for count-down. Count-down occurs exactly as described for the LOAD operation with the exception that the end-of-line control data condition disables the "load clock enable gate" but enables the "line step enable gate". The "line step enable gate" produces a line step signal for the duration of time that the "14 bit counter" is counting down to zero. This line step signal causes the line stepping motor to advance the page setter mechanical assemblies 0.001 inch to the next scan line to be produced on the writing surface.

Completion of the line step count-down process causes the "busy/done flip-flop" to be reset thereby alerting the computer to the fact that the WRITE operation is complete. The computer will therefore initiate a similar sequence of LOAD and WRITE operations for each of the 22,000 scan lines on the newspaper page.

Having thus illustrated, by way of example, one embodiment for effecting the logic function according to this invention, attention is directed back to FIG. 2 wherein there is illustrated, again merely by way of example, mechanical elements advantageously employable within the present invention. photoelectric The mechanical portion of the illustrated system consists of a read drum 18 and write drum 20 connected in series by interconnecting shaft 22 driven by a motor 24. The scanner uses a laser beam 38 generated by a laser 34 which passes through a beam splitter 36 and is focused on the read drum surface by th optics indicated 32. The reflected image from the illustrative copy on the read drum passes back through the optics and is reflected into a photoelectric transducer 40 by the beam splitter 36. Th signal generated by the photoelecetric transducer is processed by the electronics indicated at 42 and enters the electronic control logic circuitry 82 through an interconnecting cable 66. Note that the flow of illustrative copy data to the write laser modulator is controlled by one of the static shift registers discussed above; i.e., when a logic 1 appears at this shift register output, the real-time signal from the scanning electronics is used to modulate the write laser beam.

The recording portion of this system is illustrated to consist of a laser 80 generating a beam 84 which passes through a modulator 78 and is directed at the write drum 20 by the appropriate optics of 52. Note that the optics of 52 and 32 are mechanically linked together as shown at 50. The read and write laser beams are stepped from one scan line to the next down the length of the drum mechanically by a stepping motor and lead screw 54.

The photoelectric transducers at 70 and 68 sense the position of the drum and signal the electronic control logic circuitry 82 through a cable 64 when the laser can begin modulation to expose one scan line across the recording medium. If the shift registers are full, and photoelectric transducers 68 and 70 give the go-ahead, then the electronic control logic circuitry 82 clocks the information out of the shift registers such that a signal is fed to the modulator electronics 76 through a cable 72. These electronic signals contain black or white electronic data or signals generated from the photoelectric transducer to the scanning device.

When a scan line has been completely exposed on the recording medium, a command from the control logic circuitry is sent to the stepping motor drive electronics 58 through a cable 60, the laser beams move over one scan line and the cycle repeats itself.

The drum rotational speed is synchronized with the clock which drives the shift registers such that the length of an exposed scan line does not vary down the length of the recording medium. This is accomplished by providing an appropriate signal to the drum motor drive electronics 28 through cable 44.

Manifestly, changes in details of these specific embodiments of this invention can be effected without departing from the spirit and scope of the invention which is defined in, and limited solely by, the appended claims.

We claim:

1. A composite page setter system for combining illustrative material from hard copy with text data from a computer memory to create a complete page assembly, comprising:
    A. an illustrative material storage device for displaying said hard copy, and;
    B. a text material storage device comprising a computer further comprising a memory for storing data representing text material in page format and means to output said data, and;
    C. scanner means for scanning said hard copy display of said illustrative material and operable to generate a realtime electronic signal therefrom, and;
    D. a composite illustrative material and text material recording surface, and;
    E. a recorder means operable to record a composite of said illustrative material and said text material on said composite recording surface, and;
    F. electronic control logic circuitry means for selectively outputting information either directly from said scanning means for real-time scanning of said hard copy display or from text material within said computer memory, said electronic control logic circuitry means thereby providing to said recorder means a selective combination of said electronic signal from said scanning means of said hard copy display with said text format data output from said computer memory so as to record, on said recording surface, a complete page assembly having both said illustrative copy and said text material recorded in desired location and proper sequence as a final page assembly image.

2. A composite page setter as claimed in claim 1, wherein said electronic control logic circuitry means further comprises digital logic circuitry including a switching network said switching network including means to selectively combine said generated real-time electronic signal from said hard copy scanner means with said text data output from said computer memory to generate a scan line to comprise said combined recorder signal.

3. A composite page setter system as claimed in claim 1, wherein said scanner means further comprises a laser scanner means.

4. A composite page setter system as claimed in claim 1, said recorder means further comprises a laser output device to record said complete page assembly.

5. A composite page setter as claimed in claim 4, wherein said laser output device further comprises means for modulating said recorder laser to expose a recording surface comprising a printing plate and the like by reaction to a laser beam emanating from said laser device.

6. A composite page setter system as claimed in claim 1, wherein said illustrative material storage device for displaying hard copy further comprises a rotating drum, and said recording surface further comprises a rotating drum, said drums having interconnection means for simultaneous rotation, and further means for driving and controlling said drums.

7. A composite page setter system as claimed in claim 6, wherein said scanner means further comprises a laser scanner means.

8. A composite page setter system as claimed in claim 7, said laser scanner means further comprises, in combination, a laser beam output means, a beam splitter, and photoelectric transducer means to generate said real-time hard copy electronic signal from said laser beam output means, and said electronic control logic circuitry means further comprises a switching network with means to selectively combine said generated real-time hard copy signal from said laser scanner with said text data output from said computer memory to generate a scan line to comprise said combined recorder signal.

9. A composite page setter system as claimed in claim 8, wherein said generated scan line recorder signal comprises the input to said recording means further comprising a modulated laser beam.

10. A composite page setter system as claimed in claim 9, further including stepping motor driven screw means operable for moving and positioning the laser of said recorder means.

11. A composite page setter system as claimed in claim 10, further comprising means for stepping and shifting both said laser scanning and said laser recording means in oriented sequence and spatial relationship after said recording laser completes recording a scan line on said composite recording surface.

12. A process for assembling and producing a full composite newspaper, and the like, page image, comprised by both text and illustrative copy, comprising the steps of:
 A. generating text material data representing the text, and its position within a complete page format, and storing same as memory in a computer adapted to output a first electronic signal representing said text material data, and;
 B. scanning a surface including a hard copy display of illustrative copy with photoelectric transducer means and simultaneously generating a real-time second electronic signal representing the output of said scanning, and;
 C. processing said second signal, as it is being generated, with said first signal, which represents said stored text and its position within a complete page format, to provide a third signal, and;
 D. recording a full composite page image in response to, and simultaneous with, the generation of said third signal.

13. The process according to claim 12 wherein the step of generating said third signal further comprises sequentially generating complete scan line inputs for said recording step.

14. The process according to claim 12 wherein the steps of scanning and recording a full composite page are accomplished employing laser beam scanning.

* * * * *